United States Patent
Hikazudani et al.

(10) Patent No.: US 8,133,833 B2
(45) Date of Patent: Mar. 13, 2012

(54) SLURRY FOR PRODUCTION OF DENITRATION CATALYST, PROCESS FOR PRODUCING THE SLURRY, PROCESS FOR PRODUCING DENITRATION CATALYST USING THE SLURRY, AND DENITRATION CATALYST PRODUCED BY THE PROCESS

(75) Inventors: Susumu Hikazudani, Osaka (JP); Naoe Hino, Osaka (JP)

(73) Assignee: Hitachi Zosen Corporation, Osaka-shi (JP)

( * ) Notice: Subject to any disclaimer, the term of this patent is extended or adjusted under 35 U.S.C. 154(b) by 0 days.

(21) Appl. No.: 12/936,531

(22) PCT Filed: Feb. 16, 2009

(86) PCT No.: PCT/JP2009/052469
§ 371 (c)(1),
(2), (4) Date: Oct. 6, 2010

(87) PCT Pub. No.: WO2009/130934
PCT Pub. Date: Oct. 29, 2009

(65) Prior Publication Data
US 2011/0028309 A1    Feb. 3, 2011

(30) Foreign Application Priority Data
Apr. 22, 2008   (JP) .................. 2008-111401

(51) Int. Cl.
*B01J 31/06* (2006.01)
(52) U.S. Cl. ..................................... 502/159

(58) Field of Classification Search .................. None
See application file for complete search history.

(56) References Cited

U.S. PATENT DOCUMENTS

| | | | | |
|---|---|---|---|---|
| 4,749,671 A | * | 6/1988 | Saito et al. ............. | 502/64 |
| 5,272,125 A | * | 12/1993 | Weible et al. ........... | 502/242 |
| 5,686,377 A | * | 11/1997 | Banno et al. ............ | 502/330 |
| 7,585,807 B2 | * | 9/2009 | Kato et al. .............. | 502/242 |

FOREIGN PATENT DOCUMENTS

| | | |
|---|---|---|
| JP | 8-141398 | 6/1996 |
| JP | 8 141398 | 6/1996 |
| JP | 10 99684 | 4/1998 |

(Continued)

OTHER PUBLICATIONS

International Search Report issued May 12, 2009 in PCT/JP09/052469 filed Feb. 16, 2009.

*Primary Examiner* — Melvin Mayes
*Assistant Examiner* — Stefanie Cohen
(74) *Attorney, Agent, or Firm* — Oblon, Spivak, McClelland, Maier & Neustadt, L.L.P.

(57) ABSTRACT

Disclosed are a slurry for the production of a denitration catalyst, which allows a catalytically active component to be present in the inner region of a ceramic fiber sheet so as to achieve extension of the catalyst life and also allows the production process to be shortened so as to reduce the production cost; a process for producing the slurry; a process for producing a denitration catalyst using the slurry; and a denitration catalyst produced by the process. The slurry of the invention for producing a denitration catalyst comprises a silica sol, titania particles, metavanadic acid particles supported on the titania particles, metatungstic acid particles, and an organic acid ammonium salt.

16 Claims, 1 Drawing Sheet

FOREIGN PATENT DOCUMENTS

| | | |
|---|---|---|
| JP | 10-99684 | 4/1998 |
| JP | 2003-326167 | 11/2003 |
| JP | 2005-319422 | 11/2005 |
| JP | 2005 319422 | 11/2005 |
| JP | 2006 223959 | 8/2006 |
| JP | 2006-223959 | 8/2006 |
| JP | 2007-330856 | 12/2007 |
| JP | 2008 12379 | 1/2008 |
| JP | 2008-12379 | 1/2008 |
| JP | 2008-24565 | 2/2008 |

\* cited by examiner

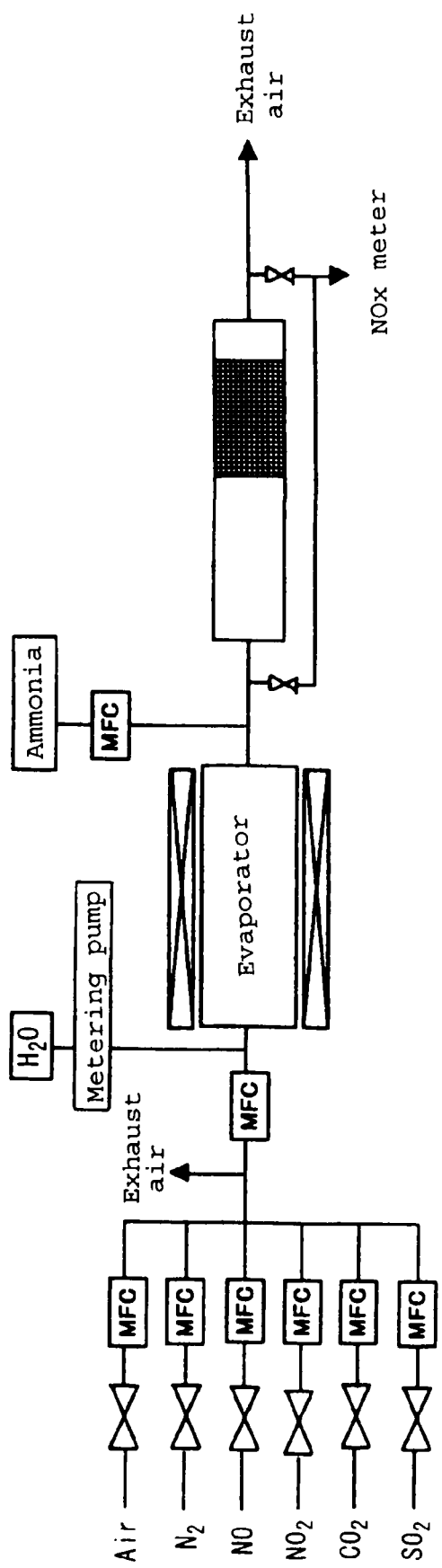

SLURRY FOR PRODUCTION OF DENITRATION CATALYST, PROCESS FOR PRODUCING THE SLURRY, PROCESS FOR PRODUCING DENITRATION CATALYST USING THE SLURRY, AND DENITRATION CATALYST PRODUCED BY THE PROCESS

TECHNICAL FIELD

The present invention relates to a slurry for the production of a denitration catalyst, which is for use in the production of a catalyst for denitration treatment of an exhaust gas from a power-generating gas turbine, a coal-fired boiler, various chemical plants, an incinerator, etc. The invention also relates to a process for producing the slurry, a process for producing a denitration catalyst using the slurry, and a denitration catalyst produced by the process.

BACKGROUND ART

A process for producing a denitration catalyst using a slurry containing a catalyst component, such as vanadium, has been described in, for example, Patent Documents 1 to 3.

For example, a conventional denitration catalyst is produced through the steps summarized as follows.

(1) A ceramic fiber honeycomb structure is immersed in a slurry of titania particulates suspended in a silica sol so that titania is supported on the honeycomb structure. The honeycomb structure is then removed from the slurry, dried, and calcined.

(2) The honeycomb structure processed in the above step (1) is immersed in an aqueous solution of ammonium metavanadate (hereinafter referred to as AMV). The honeycomb structure is then removed from the aqueous solution, dried, and calcined.

(3) The honeycomb structure processed in the above step (2) is immersed in an aqueous solution of ammonium metatungstate (hereinafter referred to as AMT). The honeycomb structure is then removed from the aqueous solution, dried, and calcined.

In the above-described conventional production process, titania can be supported inside the ceramic fiber sheet that forms the honeycomb structure. However, vanadium is supported on titania via the adsorption of AMV onto titania; therefore, vanadium is easily supported on titania near the surface of the ceramic fiber sheet, but is hardly supported inside the ceramic fiber sheet. Accordingly, vanadium tends to be supported only on titania existing near the surface of the ceramic fiber sheet.

Catalytic performance is not exhibited by titania alone, but is exhibited only when vanadium is supported on titania. Therefore, in a catalyst produced by the conventional process, only the surface area of the ceramic fiber sheet functions as a catalyst. Generally, in a denitration reaction, the gas migration on a film of laminar flow is rate-determining step for the reaction. Therefore, use of such a catalyst produced by the conventional process, where only the surface area functions as a catalyst, does not affect the ordinary denitration performance.

However, an exhaust gas from a coal-fired boiler, for example, contains some substances that are catalyst-poisoning components. As such poisoning components adhere to the catalyst with time, the denitration performance of the catalyst is gradually degraded. In such a case, if only the surface area of the ceramic fiber sheet functions as a catalyst, the poisoning component will adhere to the catalyst surface within a short period of time. As a result, there will be a significant degradation in catalytic performance, shortening the life of the catalyst.

In addition, in the conventional production process, a three-step production process including immersion, drying, and calcination is required for each component to be supported. The production thus involves multiple steps, and, in particular, the calcination step is often rate-determining step for the production. Accordingly, the productivity is poor, and this leads to high cost.

Patent Document 1: JP-A-2003-326167
Patent Document 2: JP-A-2008-024565
Patent Document 3: JP-A-2007-330856

DISCLOSURE OF THE INVENTION

Problems to be solved by the Invention

The invention aims to solve the problems mentioned above. An object of the invention is to provide a slurry for the production of a denitration catalyst, which allows a catalytically active component to be present in the inner region of a ceramic fiber sheet so as to achieve extension of the catalyst life and also allows the production process to be shortened so as to reduce the production cost; a process for producing the slurry; a process for producing a denitration catalyst using the slurry; and a denitration catalyst produced by the process.

Means for Solving the Problems

The present inventors conducted extensive research to solve the problems mentioned above. As a result, they found that by using a process including the following steps (1) to (4), titania with AMV adsorbed and supported thereon can be placed inside the ceramic fiber sheet, making it possible to provide a denitration catalyst in which the inside of the ceramic sheet can serve as a catalyst:

(1) adding AMV to a slurry of titania particulates suspended in a silica sol so that AMV is adsorbed and supported on titania in the slurry;

(2) adding AMT to the slurry obtained in (1);

(3) adding an ammonium salt of an organic acid such as ammonium polyacrylate to the slurry obtained in (2); and (4) immersing a honeycomb structure in the slurry obtained in (3), and, after removal from the slurry, drying and calcining the honeycomb structure to prepare a catalyst having titania, vanadium oxide, and tungsten oxide supported on the honeycomb structure simultaneously in a single step.

That is, the present invention is a slurry for the production of a denitration catalyst, comprising a silica sol, titania particles, metavanadic acid particles supported on the titania particles, metatungstic acid particles, and an ammonium salt of an organic acid.

In the above slurry, it is preferable that the slurry has an aqueous ammonia solution added thereto to adjust the pH to 4 to 7.

It is preferable that the ammonium salt of an organic acid is present at a concentration of 25 to 125 mL/L of the total volume of the slurry.

It is preferable that the ammonium salt of an organic acid is ammonium polyacrylate.

The invention is also a process for producing a slurry for the production of a denitration catalyst, characterized in that a titania particle powder is mixed with a silica sol to form a suspension, AMV is added thereto so that the metavanadic acid is supported on the surface of the titania particles, AMT is then added thereto, and an ammonium salt of an organic acid is added thereto.

In the above process, it is preferable that after addition of AMT and before addition of the organic acid ammonium salt, an aqueous ammonia solution is added to adjust the pH to 4 to 7.

It is preferable that the ammonium salt of an organic acid is present at a concentration of 25 to 125 mL/L of the total volume of the final slurry.

It is preferable that the ammonium salt of an organic acid is ammonium polyacrylate.

The invention is also a process for producing a denitration catalyst, characterized in that a catalyst substrate is immersed in the above slurry for the production of a denitration catalyst or in a slurry for the production of a denitration catalyst produced by the above process for producing a slurry for the production of a denitration catalyst.

In the above process, it is preferable that the catalyst substrate is a honeycomb substrate, and further that the honeycomb substrate is formed of an inorganic fiber sheet.

Further, the invention is a denitration catalyst produced by the above process.

Advantageous Effects of the Invention

In the slurry of the invention, AMV is added to a suspension obtained by mixing a titania powder with a silica sol, and thus vanadium oxide is supported on the titania particles in the suspension. Use of such a slurry allows titania with AMV adsorbed and supported thereon to be placed inside the ceramic fiber sheet, making it possible to provide a denitration catalyst in which the inside of the sheet can serve as a catalyst. Further, the slurry of the invention contains an ammonium salt of an organic acid, and this causes redispersion of the solids flocculated during the production of the slurry. Therefore, the solids to be supported as a catalyst on the honeycomb substrate have a reduced particle diameter. The catalyst active sites thus increase, improving the catalytic performance.

Further, because the steps of immersion, drying, and calcination can be done at once, productivity improvement and cost reduction will be possible.

As mentioned above, according to the invention, the production process can be shortened without an adverse effect on the catalytic activity, and a catalyst with improved durability can be produced. Accordingly, the productivity is improved, resulting in reduced cost.

BEST MODE FOR CARRYING OUT THE INVENTION

Examples of the invention and a comparative example for the comparison therewith will be given to specifically describe the invention.

Example 1

1) Titania particulates were added to a silica sol to prepare a slurry having a solid content of 45 wt % and a silica/titania weight ratio of 20:80. Further, an AMV powder was added to the slurry to a concentration of 50 g/kg of the slurry. The mixture was then stirred for 1 hour to adsorb AMV onto titania in the slurry.

2) An aqueous AMT solution (3.88 mol/L as tungsten) was further added to the slurry obtained in 1) above to a concentration of 28 mL/kg of the slurry, and the mixture was stirred for 1 hour.

3) Ammonium polyacrylate was added to the slurry obtained in 2) above to a concentration of 25 mL/L of the slurry.

Examples 2 to 5

Slurries were prepared in the same manner as in Example 1, except that the amount of ammonium polyacrylate added in the step 3) of Example 1 was changed into 50 mL (Example 2), 75 mL (Example 3), 100 mL (example 4), or 125 mL (Example 5) per liter of the slurry.

Example 6

1) Titania particulates were added to a silica sol to prepare a slurry having a solid content of 45 wt % and a silica/titania weight ratio of 20:80. Further, an AMV powder was added to the slurry to a concentration of 50 g/kg of the slurry. The mixture was then stirred for 1 hour to adsorb AMV onto titania in the slurry.

2) An aqueous AMT solution (3.88 mol/L as tungsten) was further added to the slurry obtained in 1) above to a concentration of 28 mL/kg of the slurry, and the mixture was stirred for 1 hour. Subsequently, aqueous ammonia was further added thereto to adjust the pH of the slurry to 6.5.

3) Ammonium polyacrylate was added to the slurry obtained in 2) above to a concentration of 25 mL/L of the slurry.

Examples 7 to 10

Slurries were prepared in the same manner as in Example 6, except that the amount of ammonium polyacrylate added in the step 3) of Example 6 was changed into 50 mL (Example 7), 75 mL (Example 8), 100 mL (example 9), or 125 mL (Example 10) per liter of the slurry.

Next, using the slurries prepared in Examples 1 to 10, denitration catalysts were produced. The catalysts were produced through the following steps.

1) Corrugated ceramic fiber sheets and planar ceramic fiber sheets were alternately laminated to form a honeycomb structure.

2) The honeycomb structure of 1) was immersed in each of the slurries of Examples 1 to 10. After removal from the slurry, the honeycomb structure was dried at 110° C. and then calcined at 400° C. for 1 hour to give a catalyst.

Comparative Example 1

Titania particulates were added to a silica sol to prepare a slurry having a solid content of 45 wt % and a silica/titania weight ratio of 20:80, and the same honeycomb structure as used in Examples 1 to 10 was immersed in the prepared slurry. After removal from the slurry, the honeycomb structure was calcined at 450° C. The honeycomb structure was then immersed in an aqueous AMV solution (2.75 g/L), removed therefrom, and dried at 200° C. Subsequently, the honeycomb structure was immersed in an aqueous AMT solution (0.2 mol/L as tungsten), removed therefrom, and calcined at 450° C. to give a catalyst.

Next, the denitration performance of each of the catalysts produced from the slurries of Example 1 to 10 and Comparative Example 1 was measured.

The performance test was conducted using the apparatus shown in FIG. 1 under the conditions shown in Table 1.

TABLE 1

| Temperature | 400° C. |
|---|---|
| NOx concentration at inlet | 100 ppm |
| NH$_3$/NO | 1.0 |
| H$_2$O | 10% |
| Balance | Air |

"Balance" in Table 1 shows what is added to make the total gas composition 100%, and indicates that the gas composition other than NH$_3$, NO, and H$_2$O is occupied by air (denoted as Air in the table).

The resulting denitration rates are shown in Table 2 below together with the supported amount of each catalyst. The supported amount herein means the total amount of catalyst components supported (titania, vanadium oxide, and tungsten oxide). The supported amount is determined from the weight difference calculated by subtracting the weight of the starting honeycomb structure before the step of immersion in a slurry from the weight of the honeycomb structure after the steps of immersion of the honeycomb structure in the slurry and calcination of the honeycomb structure removed from the slurry.

TABLE 2

| | Denitration Rate (%) | Supported Amount (g/m$^2$) |
|---|---|---|
| Example 1 | 82.3 | 180.5 |
| Example 2 | 80.4 | 140.3 |
| Example 3 | 79.2 | 120.3 |
| Example 4 | 78.3 | 115.4 |
| Example 5 | 77.7 | 118.6 |
| Example 6 | 76.3 | 110.0 |
| Example 7 | 77.2 | 115.5 |
| Example 8 | 78.1 | 116.9 |
| Example 9 | 79.0 | 120.5 |
| Example 10 | 80.1 | 125.7 |
| Comparative Example 1 | 57.0 | 100 |

Comparison of the results of Examples 1 to 10 with the results of Comparative Example 1 shows that the supported amounts in Examples 1 to 10 are all larger than in Comparative Example, and that the denitration performance is also much higher in Examples 1 to 10 than in Comparative Example 1. In particular, although there is no great difference in supported amount between Examples 3 to 10 and Comparative Example 1, a large difference in denitration performance is observed.

BRIEF DESCRIPTION OF THE DRAWINGS

FIG. 1 is a flow sheet showing a performance testing apparatus.

The invention claimed is:

1. A slurry for the production of a denitration catalyst, comprising a silica sol, titania particles, vanadium oxide particles supported on the titania particles, ammonium salt of metatungstic acid particles, and an ammonium salt of an organic acid.

2. The slurry for the production of a denitration catalyst according to claim 1, having an aqueous ammonia solution added thereto to adjust the pH to 4 to 7.

3. The slurry for the production of a denitration catalyst according to claim 1, wherein the ammonium salt of an organic acid is present at a concentration of 25 to 125 mL/L of the total volume of the slurry.

4. The slurry for the production of a denitration catalyst according to claim 1, wherein the ammonium salt of an organic acid is ammonium polyacrylate.

5. A process for producing a slurry for the production of a denitration catalyst, comprising mixing a titania particle powder with a silica sol to form a suspension, adding an ammonium metavanadate powder to the suspension so that vanadium oxide is supported on the surface of the titania particles, adding ammonium metatungstate to the suspension, and adding an ammonium salt of an organic acid to the suspension.

6. The process for producing a slurry for the production of a denitration catalyst according to claim 5, wherein after adding the ammonium metatungstate and before adding the ammonium salt of an organic acid, an aqueous ammonia solution is added to adjust the pH to a range from 4 to 7.

7. The process for producing a slurry for the production of a denitration catalyst according to claim 5, wherein the ammonium salt of an organic acid is present at a concentration of 25 to 125 mL/L of the total volume of the final slurry.

8. The process for producing a slurry for the production of a denitration catalyst according to claim 5, wherein the ammonium salt of an organic acid is ammonium polyacrylate.

9. A process for producing a denitration catalyst, comprising immersing a catalyst substrate in a slurry for the production of a denitration catalyst according to claim 1.

10. The process according to claim 9, wherein the catalyst substrate is a honeycomb substrate.

11. The process according to claim 10, wherein the honeycomb substrate is formed of an inorganic fiber sheet.

12. A denitration catalyst produced by a process according to claim 9.

13. A process for producing a denitration catalyst, comprising immersing a catalyst substrate in a slurry for the production of a denitration catalyst produced by the process according to claim 5.

14. The process according to claim 13, wherein the catalyst substrate is a honeycomb substrate.

15. The process according to claim 14, wherein the honeycomb substrate is formed of an inorganic fiber sheet.

16. A denitration catalyst produced by the process according to claim 13.

* * * * *